US006925432B2

(12) United States Patent
Lee et al.

(10) Patent No.: US 6,925,432 B2
(45) Date of Patent: Aug. 2, 2005

(54) METHOD AND APPARATUS USING DISCRIMINATIVE TRAINING IN NATURAL LANGUAGE CALL ROUTING AND DOCUMENT RETRIEVAL

(75) Inventors: Chin-Hui Lee, Basking Ridge, NJ (US); Hong-Kwang Jeff Kuo, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 925 days.

(21) Appl. No.: 09/748,433
(22) Filed: Dec. 26, 2000

(65) Prior Publication Data

US 2002/0116174 A1 Aug. 22, 2002

Related U.S. Application Data

(60) Provisional application No. 60/239,442, filed on Oct. 11, 2000.

(51) Int. Cl.[7] .............................................. G06F 17/27
(52) U.S. Cl. ............................................... 704/5; 704/9
(58) Field of Search .................................. 704/5, 9, 240

(56) References Cited

U.S. PATENT DOCUMENTS

| 5,243,520 | A | * | 9/1993 | Jacobs et al. ................... 704/9 |
| 5,267,345 | A | * | 11/1993 | Brown et al. ................ 704/255 |
| 5,675,707 | A | | 10/1997 | Gorin et al. ................ 395/2.66 |
| 5,991,710 | A | * | 11/1999 | Papineni et al. ................ 704/2 |
| 6,076,053 | A | | 6/2000 | Juang et al. ................ 704/236 |
| 6,321,372 | B1 | * | 11/2001 | Poirier et al. ................ 717/122 |
| 6,421,668 | B1 | * | 7/2002 | Yakhini et al. ................... 707/6 |
| 6,636,862 | B2 | * | 10/2003 | Lundahl et al. .............. 707/101 |

OTHER PUBLICATIONS

Carpenter, B. et al., "Natural Language Call Routing: A Robust, Self–Organizing Approach", *ICSLP–98*, pp. 2059–2062 (1998).
Carpenter, B. et al., "Dialogue Management in Vector–Based Call Routing", *Proceedings of COLING–ACL–98*, pp. 256–262 (1999).
Carpenter, B. et al., "Vector–based Natural Language Call Routing", *Computational Linguistics*, vol. 25, No. 3, pp. 361–388 (1999).
Katagiri, S. et al., "Pattern Recognition Using A Family of Design Algorithms Based Upon the Generalized Probabilistic Descent Method," *Proceedings of the IEEE*, vol. 86, pp. 2345–2373 (1998).

(Continued)

*Primary Examiner*—David L. Ometz
*Assistant Examiner*—Michael N. Opsasnick
(74) *Attorney, Agent, or Firm*—Kenneth M. Brown (57) ABSTRACT

A method and apparatus for performing discriminative training of, for example, call routing training data (or, alternatively, other classification training data) which improves the subsequent classification of a user's natural language based requests. An initial scoring matrix is generated based on the training data and then the scoring matrix is adjusted so as to improve the discrimination between competing classes (e.g., destinations). In accordance with one illustrative embodiment of the present invention a Generalized Probabilistic Descent (GPD) algorithm may be advantageously employed to provide the improved discrimination. More specifically, the present invention provides a method and apparatus comprising steps or means for generating an initial scoring matrix comprising a numerical value for each of a set of n classes in association with each of a set of m features, the initial scoring matrix based on a set of training data and, for each element of said set of training data, based on a subset of said features which are comprised in the natural language text of said element of said set of training data and on one of said classes which has been identified therefor; and based on the initial scoring matrix and the set of training data, generating a discriminatively trained scoring matrix for use by said classification system by adjusting one or more of said numerical values such that a greater degree of discrimination exists between competing ones of said classes when said classification requests are performed, thereby resulting in a reduced classification error rate.

32 Claims, 7 Drawing Sheets

OTHER PUBLICATIONS

Katagiri, S. et al., "New Discriminative Algorithm Based on the Generalized Probabilistic Descent Method," in *Proc. IEEE Workshop on Neural Network for Signal Processing*, pp. 299–309 (1991).

Lee, C–H, et al., "A Study on Natural Language Call Routing", in *Proceedings of the Interactive Voice Technology for Telecommunication Applications Workshop* (1998).

Liu, C–S., :A Study on Minimum Error Discriminative Training For Speaker Recognition, *J. Acoust. Soc. Am.*, vol. 97, pp. 637–648 (1995).

Rahim, M.G. et al., "Simultaneous ANN Feature and HMM Recognizer Design Using String–Based Minimum Classification Error (MCE) Training," in *ICSLP–96*, (1996).

U.S. Appl. No. 09/124,301 filed Jul. 29, 1998.

E. McDermott, et al., "A Telephone–Based Director Assistance System Adaptively Trained Using Minimum Classification Error/Generalized Probabilistic", *IEEE*, vol. 6, Conf. 21, pp. 7–10 (May 1996).

J. Chu–Carroll, et al., "Vector–based Natural Language Call Routing", *Computational Linguistics*, vol. 25, No. 3, pp. 361–388 (Sep. 1999).

S. Katagiri, et al., "Pattern Recognition Using a Family of Design Algorithms Based Upon the Generalized Probabilistic Descent Method", *Proceedings of the IEEE*, vol. 86, No. 11, pp. 2345–2372 (Nov. 1988).

* cited by examiner

METHOD AND APPARATUS USING DISCRIMINATIVE TRAINING IN NATURAL LANGUAGE CALL ROUTING AND DOCUMENT RETRIEVAL

CROSS-REFERENCE TO RELATED APPLICATION

The present application hereby claims the benefit of previously filed Provisional patent application Ser. No. 60/239,442, "Discriminative Training in Natural Language Call Routing," filed by H.-K. J. Kuo and C.-H. Lee on Oct. 11, 2000.

FIELD OF THE INVENTION

The present invention relates generally to the field of natural language understanding and more particularly to techniques for performing call routing, document retrieval, or other similar functions which perform classifications based on natural language based requests.

BACKGROUND OF THE INVENTION

Almost all organizations of significant size receive numerous telephone calls which must be appropriately handled based on the desires of the caller. This handling or routing is generally performed by human or automated call routing systems. Information is received from the caller, and the call is directed based on the information received. Human operators typically perform this function accurately and efficiently, but at a relatively high cost. Automated systems of the prior art often employ hierarchical menus in which a caller is confronted with a list of choices from which a selection is to be made. The caller typically selects menu options by making entries from a telephone keypad. Often, making a choice opens up a menu of further choices. In complex organizations, the menu hierarchy can be quite elaborate, requiring several choices by a caller, and requiring a caller to listen to an elaborate menu in order to understand the available choices. Such menus are a widespread cause of caller dissatisfaction with many of the presently used automated routing systems.

In many prior art call routing systems, voice recognition may be used as a substitute for keypad entries. That is, the caller is allowed to voice a number as an alternative to making a keypad entry. As presently used in call routing systems, therefore, automated voice recognition does little to simply the process. What would be more desirable to most users is a system in which the caller is able to describe his desired function and have an automated system direct the call according to the description.

Such a direct, natural language call routing system, in which a caller simply asks for the desired destination or describes the function to be performed, would greatly simplify the call routing process. However, significant obstacles to such a system exist. For example, it has been found that given such a system, callers will typically phrase their requests not by giving a destination name, but by describing the activity they would like to perform. In many cases callers have difficulty in formulating their requests, and instead provide a roundabout description of what they would like to do. Sometimes a destination name given is ambiguous, in that the precise name given does not exist, but the organization has several organizations falling under similar headings.

In such natural language call routing systems, callers may be routed to desired departments based on natural spoken responses to an open-ended prompt such as, for example, "How may I direct your call?" Note that in designing a voice response system to adequately handle these calls, it is not sufficient to include just the names of the departments in the vocabulary, and what the callers may say cannot be fully anticipated. Rather, requests from real callers should be collected for "training" the system—that is, for developing the vocabulary keywords and how calls will be routed based on the presence of such keywords in the caller's request. Data-driven techniques are essential in the design of such systems.

For example, in co-pending U.S. patent application Ser. No. 09/124,301, "Methods and Apparatus for Automatic Call Routing Including Disambiguating Routing Decisions," filed on Jul. 29, 1998 by R. Carpenter and J. Chu-Carroll (hereinafter, Carpenter et al.), a vector-based information retrieval technique for performing call routing is described. U.S. patent application Ser. No. 09/124301, which is commonly assigned to the assignee of the present invention, is hereby incorporated by reference as if fully set forth herein. Specifically, in the system described in Carpenter et al., a routing matrix is trained based on statistics regarding the occurrence of words and word sequences in a training corpus after morphological and stop-word filtering are performed. New user requests are then represented as feature vectors and are routed based on a cosine similarity score with the model destination vectors as encoded in the routing matrix. Although the system described in Carpenter et al. is capable of routing many user requests appropriately, there are still many situations in which disambiguation (e.g., posing a disambiguating query back to the user) must be performed to properly route the call.

In a different but somewhat related application to natural language based call routing, users of an on-line document storage and retrieval system such as, for example, the Internet, often use natural language (i.e., text) to describe which document or documents they would like to retrieve. Similar problems to those described in the context of an automated call routing system exist, and as such, similar automated classification systems are required. Specifically, in both the call routing application and the document retrieval application, natural language text is used to classify the user's request into one of a fixed number of possible "destinations"—either a department or similar organizational unit in the former case, or a specific document (or a set of documents) in the latter case. (Note, of course, that in the call routing application, the natural language text is typically obtained by recognizing and converting the user's speech, whereas in the document retrieval application, the user typically types in the text directly.) Moreover, similar limitations to the performance of such automated classification systems exist when used in these document retrieval applications. Numerous other applications can also make advantageous use of a system which is able to classify natural language text into one of a number of "relevant" categories, and many of these applications also suffer from these limitations.

For the reasons described above, and regardless of the particular application (e.g., call routing or document retrieval) to which it is applied, it would be desirable for an automated natural language based classification system to be more immune to the problem of ambiguous classifications as has been the case with prior art systems of this type. That is, it would be desirable for such a system to have an improved ability to discriminate between alternative classifications which would be otherwise likely to be confused.

SUMMARY OF THE INVENTION

In accordance with the principles of the present invention a method and apparatus for performing discriminative training of, for example, call routing training data (or, alternatively, other classification training data) is provided in order to improve the subsequent classification of a user's natural language based requests. An initial scoring matrix is generated based on the training data and then the scoring matrix is adjusted so as to improve the discrimination between competing classes (e.g. destinations). In accordance with one illustrative embodiment of the present invention, a Generalized Probabilistic Descent (GPD) algorithm may be advantageously employed to provide the improved discrimination.

More specifically, the present invention provides a method and apparatus for training a scoring matrix for use by a classification system, the classification system for use in performing classification requests based on natural language text and with use of said scoring matrix which has been based on a set of training data comprising natural language text, the method or apparatus comprising steps or means for generating an initial scoring matrix comprising a numerical value for each of a set of n classes in association with each of a set of m features, the initial scoring matrix based on said set of training data and, for each element of said set of training data, based on a subset of said features which are comprised in said natural language text of said element of said set of training data and on one of said classes which has been identified therefor; and based on the initial scoring matrix and said set of training data, generating a discriminatively trained scoring matrix for use by said classification system by adjusting one or more of said numerical values such that a greater degree of discrimination exists between competing ones of said classes when said classification requests are performed, thereby resulting in a reduced classification error rate.

DETAILED DESCRIPTION

Call Routing Overview

In vector-based natural language call routing, call routing is treated as an instance of document routing, where a collection of labeled documents is used for training and the task is to judge the relevance of a set of test documents. Each destination in the call center is treated as a collection of documents (transcriptions of calls routed to that destination), and a new caller request is evaluated in terms of relevance to each destination.

Specifically, as is fully familiar to those of ordinary skill in the art, the training process involves constructing a routing matrix R. Each document (customer utterances within a caller session) is first passed through morphological processing where the root forms of words are extracted. A list of ignore words are eliminated and a list of stop words are replaced with place holders. Then n-grams are extracted, specifically unigrams, bigrams and trigrams. In accordance with one illustrative embodiment of the present invention, only unigrams that occur at least twice and bigrams and trigrams that occur at least three times in the corpus are advantageously included. This leads to a list of m terms, also referred to as features.

The m×n term-document matrix may then be constructed. In one possible arrangement, the rows represent the m terms and the columns represent the n destinations. In accordance with one illustrative embodiment, the routing matrix R may be the transpose of the term-document matrix, where $r_{vw}$ is the frequency with which term w occurs in calls to destination v. Each term may be weighted according to inverse document frequency and may also be normalized to unit length. Singular value decomposition and sigmoid transformation, each familiar to those skilled in the art, may also be employed in certain illustrative embodiments of the present invention.

New user requests may be represented as feature vectors and may be routed based on the cosine similarity score with the n model destination vectors $\vec{r}_i$ in the routing matrix R. Let $\vec{x}$ be the m-dimensional observation vector representing the weighted terms which have been extracted from the user's utterance. One possible routing decision, in accordance with one illustrative embodiment of the present invention, is to route to the destination with the highest cosine similarity score:

$$\text{destination } \hat{j} = \max_j \cos\phi_j = \operatorname{argmax}_j \frac{\vec{r}_j \cdot \vec{x}}{\|\vec{r}_j\| \|\vec{x}\|}. \quad (1)$$

In this case, a classification error occurs when the score of the correct class is less than the maximum score. Notice that according to the way the routing matrix is constructed, there may be no guarantee that the classification error rate will be minimized. In accordance with the principles of the present invention, however, the performance of the routing matrix can be advantageously improved by adjusting the models to achieve a reduced or, preferably, a minimum (at least locally, and in the probabilistic sense) classification error rate, as described in detail below.

An Illustrative Method for Performing Discriminative Training

In accordance with the principles of the present invention, the nonlinear optimization problem of achieving minimum classification error may be advantageously "solved" by adopting the generalized probabilistic descent (GPD) algorithm, fully familiar to those of ordinary skill in the art. As applied in the current application (or set of applications), the n×m elements of the routing matrix may be regarded as the classifier parameters to be adjusted, and a minimum classification error may be achieved by advantageously improving the separation of the correct class from competing classes. In accordance with one illustrative embodiment of the present invention, the dot product of normalized query and destination vectors may be used as a discriminant function. In the training algorithm, the model destination vectors may be advantageously normalized after each adjustment step in order to maintain the equivalence between the measures of dot product and cosine score used in computing the classification error rate. Intuitively, that is, the instant algorithm looks at each training example and adjusts the model parameters of the correct and competing classes in order to improve the scores of the correct class relative to the other classes.

Specifically, let $\vec{x}$ be the observation vector and $\vec{r}_j$ be the model document vector for destination j. We define the "discriminant function" for class j and observation vector $\vec{x}$ to be the dot product of the model vector and the observation vector as follows:

$$g_j(\vec{x}, R) = \vec{r}_j \cdot \vec{x} = \sum_i r_{ji} x_i. \quad (2)$$

Note that this function is identical to the cosine score if the two vectors have been normalized to unit length.

Given that the correct target destination for $\vec{x}$ is k, we define the "misclassification function" as $$d_k(\vec{x}, R) = -g_k(\vec{x}, R) + G_k(\vec{x}, R), \quad (3)$$

where $$G_k(\vec{x}, R) = \left[ \frac{1}{K-1} \sum_{j \neq k, 1 \leq j \leq K} g_j(\vec{x}, R)^\eta \right]^{\frac{1}{\eta}} \quad (4)$$

is defined as the "anti-discriminant function" of the input $\vec{x}$ in class k, where K−1 is the number of competing classes. Note that in the limit as the positive parameter $\eta \to \infty$, the anti-discriminant function is dominated by the biggest competing discriminant function: $G_k(\vec{x}, R) \to \max_{j \neq k} g_j(\vec{x}, R)$. Notice also that $d_k(\vec{x}, R) > 0$ implies misclassification—that is the discriminant function for the correct class is less than the anti-discriminant function.

A smooth differentiable 0–1 function such as the sigmoid function may be chosen to be the "class loss function", defined as follows:

$$l_k(\vec{x}, R) = l(d_k) = \frac{1}{1 + \exp^{-\gamma d_k + \theta}}, \quad (5)$$

where $\gamma$ and $\theta$ are constants which control the slope and the shift of the sigmoid function, respectively.

The parameter set R may then be advantageously adjusted in an iterative fashion, in accordance with the following:

$$R_{t+1} = R_t + \delta R_t. \quad (6)$$

where $R_t$ is the parameter set at the t-th iteration. The correction term $\delta R_t$ may be advantageously solved using the training sample $\vec{x}_1$ given for that iteration, whose true destination is k, as follows:

$$\delta R_t = \epsilon_t \nabla l_k(\vec{x}_t, R_t), \quad (7)$$

where $\epsilon_t$ is the learning step size.

Given the above framework for discriminative training in general, the specific algebra which may be employed for the instant applications in accordance with an illustrative embodiment of the present invention may be derived as follows. Specifically, let $r_{vw}$ be elements of the routing matrix R. Then at iteration step t, $$\nabla l_k(\vec{x}_i, R_t) = \frac{\partial l_k(\vec{x}_i, R_t)}{\partial R_t} = \frac{\partial l_k}{\partial d_k} \frac{\partial d_k(\vec{x}_i, R_t)}{\partial r_{vw}}. \quad (8)$$

Note that for the $l_k$ we have chosen, $$\frac{\partial l_k}{\partial d_k} = \gamma l_k(d_k)(1 - l_k(d_k)). \quad (9)$$

From equations (2), (3) and (4), the following can be shown:

$$\frac{\partial d_k(\vec{x}_i, R_j)}{\partial r_{vw}} = \begin{cases} -x_w & \text{if } v = k \\ \dfrac{x_w G_k(\vec{x}_i, R)(\vec{r}_v \cdot \vec{x}_i)^{\eta-1}}{\sum_{j \neq k} (\vec{r}_j \cdot \vec{x}_i)^\eta} & \text{if } v \neq k \end{cases} \quad (10)$$

Therefore, given the observation vector $\vec{x}_1$ at each iteration, each element of the routing matrix may be advantageously adjusted in accordance with:

$$r_{vw}(t+1) = \begin{cases} r_{vw}(t) + \epsilon_i \dfrac{\partial l_k}{\partial d_k} x_w & \text{if } v = k \\ r_{vw}(t) - \dfrac{\epsilon_i \dfrac{\partial l_k}{\partial d_k} x_w G_k(\vec{x}_i, R)(\vec{r}_v \cdot \vec{x}_i)^{\eta-1}}{\sum_{j \neq k}(\vec{r}_j \cdot \vec{x}_i)^\eta} & \text{if } v \neq k \end{cases} \quad (11)$$

Equation (11) shows that the model vector for the correct class may be advantageously adjusted differently from those of the competing classes—notice in particular the difference in the sign of the adjustment. Intuitively, the score of the correct class is thus improved relative to the scores of the competitors by the incremental adjustments. Note that the adjustment to the w-th component of each model vector is advantageously proportional to the learning step size $\epsilon_1$, the size of the w-th component in the observation vector $\vec{x}_t$ and the slope of the sigmoid function $$\frac{d l_k}{d d_k}.$$

This slope is zero for very large or small values of $d_k$ and positive in a certain region—the decision boundary which depends on $\gamma$ and $\theta$. Advantageously, only the training data whose $d_k$ values fall within the decision boundary will affect the model parameters significantly.

After each adjustment step, the affected models $\vec{r}_t$ are advantageously normalized to unit length in order that the discriminant function be identical to the cosine similarity score used in classification. The initial training vectors may be advantageously normalized once before the discriminative training begins.

In accordance with one illustrative embodiment of the present invention, the same set of training data may be used both to construct the initial routing matrix and then for performing discriminative training. Each training vector may be composed of the information provided by all the customer utterances within each call session, including disambiguating follow-up utterances, as described below and as described in further detail, for example, in Carpenter et al. Each call session may then be manually routed to a destination, representing the ground truth of the correct class. In the discriminative training process, multiple passes may be advantageously made through the entire training set, and within each pass, the order in which each training vector is processed may be advantageously randomized.

It can be seen from the above equations that a number of parameters for GPD training may be advantageously chosen. η controls the relative importance among the competitors—a larger value emphasizes the strongest competitors only, γ and θ control the decision boundary through modifying the shape and location of the sigmoid function, $\epsilon_1$ controls the step size of the gradient descent—it may be reduced gradually in order to advantageously achieve stable convergence. In particular, in accordance with one illustrative embodiment of the present invention, the step size is chosen to be a function like 1/t, but chosen so that it changes only once every 25 passes, for example. Note that K−1 is the total number of competitors to the correct class. In practice, the discriminative training can be advantageously focused on just the top M competitors (where M<K−1) instead of on all K−1 classes. Another parameter is the number of passes through the training set which can be expressed as a stopping criterion, for example, when the change in the empirical loss function is less than a certain threshold.

Several experiments have been run to find appropriate values of parameters to use in the discriminative training. The results do not appear to be sensitive to most of the parameters. Because the computational cost is advantageously low, over a hundred passes were run through the training set and the choice of a relatively small $\epsilon_t$ was chosen, which may have advantageously reduced the sensitivity of the results to the values of the other parameters. In particular, the following parameter values may be advantageously used: η=2; γ=8.0; θ=0.0, $\epsilon_t$=3×10$^{-6}$ (initially), and M=4.

Note that the GPD algorithm is an iterative algorithm that improves the empirical loss in the training data. One issue is how to define a stopping criterion. In accordance with one illustrative embodiment of the present invention, a threshold value for the change of the empirical loss may be employed—that is, training is stopped when the change in empirical loss after a pass through the training set is less than a certain threshold. In accordance with another illustrative embodiment of the present invention, a threshold based on the classification error rate of the training set may be employed.

Note also that in an original routing matrix, all of the elements are positive because they have been derived from the counts of the occurrence of the terms in the training data. The discriminative training procedure, as formulated herein however, does not guarantee that the parameters remain positive. In fact, checking the routing matrix after discriminative training has been performed in accordance with the principles of the present invention may reveal that many of the elements have become negative. This makes sense intuitively since the presence of some terms can actually provide "negative evidences" against a particular possible destination, particularly when such terms may be helpful in distinguishing a class from its closest competitors. Note in particular that at all levels of rejection, the discriminative training method in accordance with the present invention invariably performs better than the baseline (i.e., the prior art) approach, because the separation of the correct classes from the competing classes have been increased. Therefore, the advantage of discriminative training in accordance with the principles of the present invention is not only in reducing the classification error rate, but also in improving the robustness of the classifier.

Figure 1:
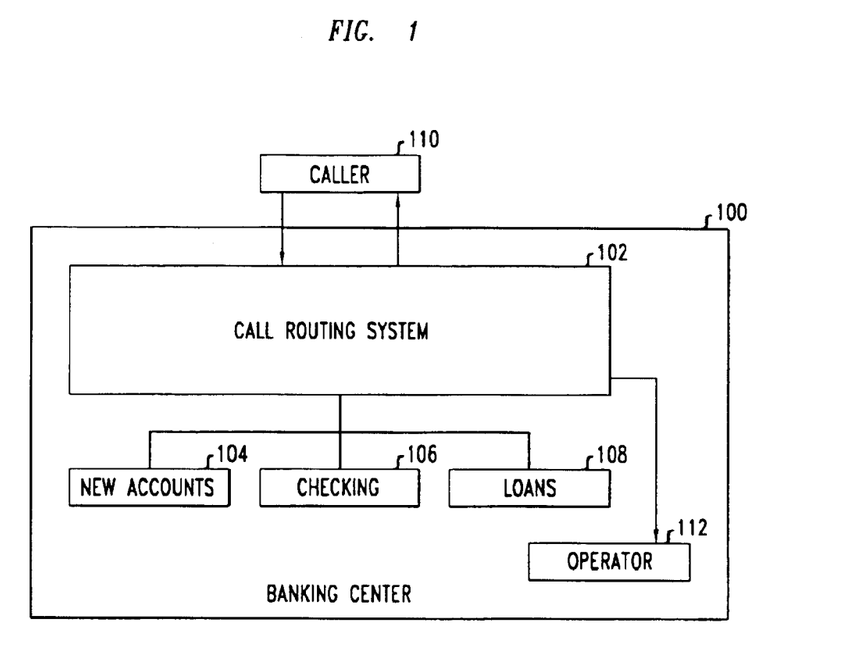
FIG. 1 shows an illustrative banking center employing a call routing system which may have been advantageously trained in accordance with an illustrative embodiment of the present invention.

An Illustrative Call Routing System and Method for Discriminative Training Thereof FIG. 1 illustrates a banking center 100 employing a call routing system 102 which may have been advantageously trained in accordance with an illustrative embodiment of the present invention. The banking center receives many different calls, with each call needing to be routed to an appropriate destination. To provide a simplified illustration of the functions required of the call routing system 102, three organizations within the banking center 100 are shown in the figure. These are the New Accounts Department 104, the Checking Department 106, and the Loan Department 108. When a caller 110 places a call to the banking center 100, the call routing system 102 answers the call, providing voice information to the caller 110. The call routing system 102 receives voice responses from the caller 110, analyzes the voice responses, and routes the call to the appropriate one of the New Accounts Department 104, the Checking Department 106, or the Loan Department 108. If the call routing system is unable to determine the appropriate destination for the call, the call is directed to a human operator 112.

The call routing function may be quite complex and require subtle differentiation, as similar words may be used to describe different functions. For example, if the caller 110 were to say "Checking accounts, please", it may indicate that the call is to be directed to the New Accounts Department 104, where the caller 110 can inquire about opening a new checking account, or it may indicate that the caller 110 has a question about his already existing checking account, in which case the call should be directed to the Checking Department 106. However, if the caller 110 were to say "I would like some information about my checking account", the use of the word "my" can be used to indicate that the caller wants to know about an already existing account. The proper destination of the call is therefore the Checking Department 106, and not the New Accounts Department 104. It is advantageous, therefore, for the call routing system to have sufficient subtlety to attach significance to the use of words such as "my" in this context, and to use it to determine the correct destination for the call. The call routing system 102 therefore decodes and collects the words used by the caller 110 and employs them to determine the correct destination for the call using methods which predict the likelihood that a call containing particular words will be intended for a particular destination.

Figure 2:
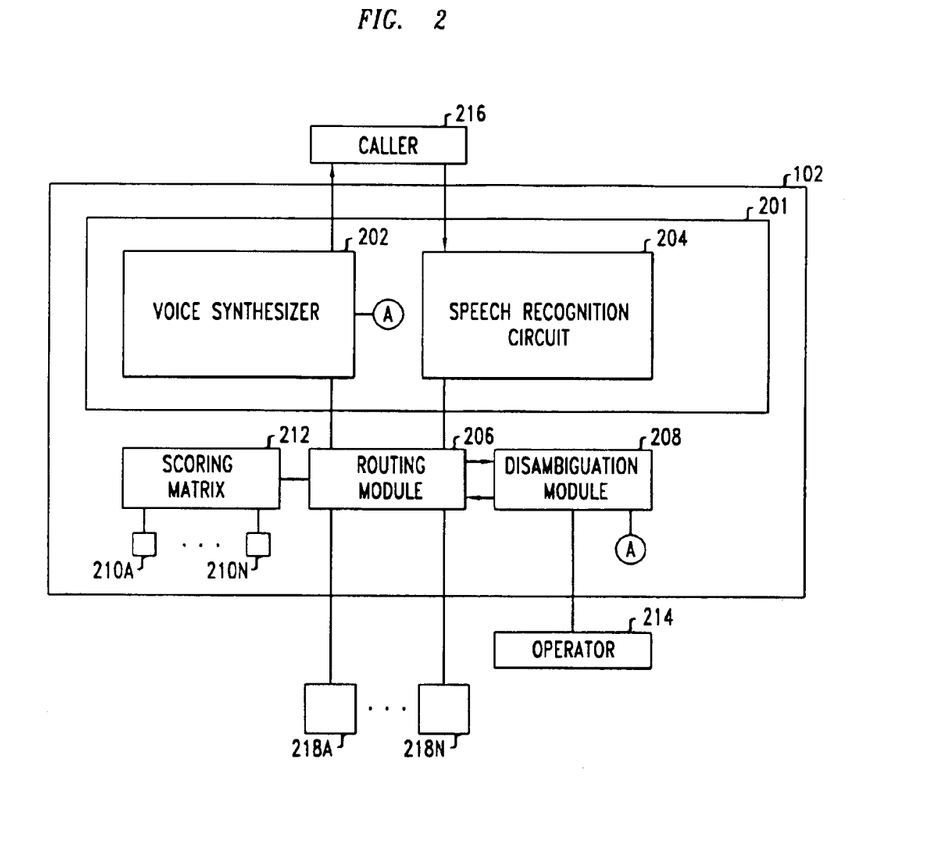
FIG. 2 shows an illustrative call routing system such as that shown in FIG. 1, which call routing system may have been advantageously trained in accordance with an illustrative embodiment of the present invention.

FIG. 2 is a diagram illustrating in greater detail the call routing system 102 shown in FIG. 1. The routing system 102 includes a caller interface 201 for conveying information to the customer and retrieving information provided by the caller for use in routing the call. The caller interface 201 preferably includes a voice synthesizer 202 and a voice recognition unit 204. The call routing system 102 also includes a routing module 206 and a disambiguation module 208. The routing module matches information received from the caller interface 201 against one of a plurality of documents 210A . . . N using information contained in a scoring matrix 212. The documents 210A . . . N and the scoring matrix 212 are created by a training system described in further detail in connection with the discussion of FIGS. 3 and 5. Specifically, the scoring matrix 212 has been trained with use of an illustrative discriminative training method in accordance with the principles of the present invention. The routing module 206 is described in further detail in connection with the discussion of FIG. 4. The routing module 206 and the disambiguation module 208 are capable of routing calls to a human operator 214 under appropriate circumstances.

The routing system 102 receives calls from a caller 216 and provides information and, if deemed necessary, poses questions to the caller 216 using voice prompts produced by the voice synthesizer 202. The caller 216 provides voice input requests and voice responses, which are received and converted to text by the voice recognition unit 204. The voice recognition unit 204 passes the text to the routing module 206, which attempts to appropriately route the call to one of a plurality of possible destinations 218A . . . N, based on analysis of the text received from the voice recognition unit 204. The routing module generates a set of candidate destinations which is a subset of the possible destinations 218A . . . N. If the routing module 206 is unable to generate a set of candidate destinations, the routing module 206 passes the call to the human operator 214. If the routing module 206 is able to generate a set of candidate destinations, but is unable to reduce the set to a single unique destination, the routing module passes the call to the disambiguation module 208. The disambiguation module 208 further disambiguates the candidate destinations by creating disambiguating questions for the caller 216 and using the responses of the caller 216 to further distinguish between the candidate destinations.

Figure 3:
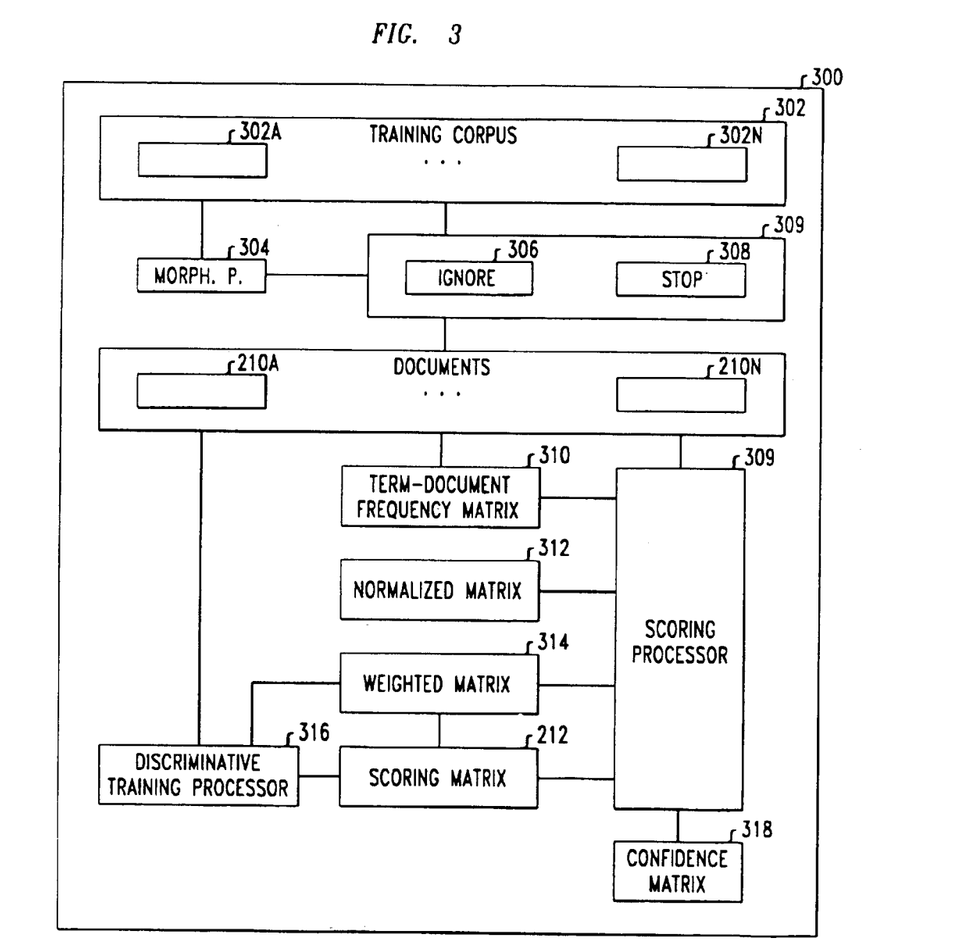
FIG. 3 shows an illustrative training system which may be advantageously used in accordance with an illustrative embodiment of the present invention for training the illustrative call routing system of FIG. 2.

FIG. 3 illustrates a training system which is used in accordance with an illustrative embodiment of the present invention to create the documents 210A . . . N and the scoring matrix 212 for use by the routing module 206 illustrated in FIG. 2. In particular, the illustrative training system operates in accordance with the principles of the present invention to provide, inter alia, a scoring matrix which has been discriminatively trained. The training system is provided with a training corpus 302. The training corpus 302 is created by receiving a plurality of calls, routing each call to a destination via a human operator, and saving the text of the caller's contribution to each call in a training document 302A . . . N associated with the destination to which the call is routed. Each of the training documents 302A . . . N is filtered through a morphological processor 304, which extracts the root form of each word of the document. Next, in accordance with certain illustrative embodiments of the present invention, the root forms of the caller utterances are filtered through two lists, an ignore list 306 and a stop list 308 stored in memory 309.

The ignore list 306 contains "noise words", which are words which do not represent an articulate utterance and are to be simply filtered out. An example of a response containing a noise word is "I'd like to speak to someone about a car, uh, loan." The noise word "uh" is filtered out, allowing extraction of the two-word term or bigram "car loan." The stop list 308 filters out common function words that are irrelevant for a routing task. Which words appear on the stop list will depend on the application, but typically such words will be function words such as "the" and "is". Unlike the ignore filter 306, the stop filter 308 inserts placeholders in place of words on the stop list 308. Thus, the phrase "I want to check on an account" becomes "<sw> <sw> <sw> check <sw> <sw> account." where "<sw>" represents a stop word. Without such placeholders, the bigram "check, account" would be extracted, just as if the caller had used the term "checking account."

In accordance with other illustrative embodiments of the present invention, stop word filtering is not performed at all. Since stop word identification may in some cases require the use of human expert knowledge, it may be advantageous to eliminate such a requirement. In such a case, stop words are treated as any other words, thereby increasing the size of the resulting scoring matrix. To compensate for this increased size, however, certain illustrative embodiments of the present invention may forego the inclusion of bigrams and/or trigrams as features, thereby correspondingly reducing the scoring matrix size. Although this reduces the useful feature set, the advantages inherent in the use of discriminative training in accordance with the principles of the present invention nonetheless provide for an overall high quality system performance.

After filtering is completed (i.e., either ignore word filtering or both stop word and ignore word filtering), the result of filtering each of the training documents 302A . . . N is converted to a corresponding document 210A . . . N in the routing module 206. Information contained in the documents 210A . . . N is used to create the scoring matrix 212 which is used by the routing module 206 to identify a destination for each call, as will be described in greater detail in connection with the discussion of FIG. 4 below. Each of the documents 210A . . . 210N is a bag or collection of terms associated with a particular destination. A term is a single or multiple-word utterance which has relevance to the routing function.

The training system 300 further employs a scoring processor 309 to create the scoring matrix 212 shown in FIG. 2 above. The first step in creating the scoring matrix 212 is the creation of a term-document frequency matrix 310. The term-document frequency matrix 310 is preferably an m×n matrix, whose rows represent the m terms (features), whose columns represent the n destinations, and where an entry $A_{t,d}$ is the frequency with which term t occurs in calls to destination d. The term-document frequency matrix 310 forms a basis-for associating a query with one of the documents 210A . . . N.

A caller's response is preferably associated with a document 210A . . . N based on the assumption that if a term occurred frequently with a given destination in the training corpus 302, then an occurrence of that term in a caller's response indicates that the call should be routed to that destination. If the term-document frequency matrix 310 is designated A, and has m terms and n destinations, then an element $a_{t,d}$ of the matrix A for $1 \leq t \leq m$ and $1 \leq d \leq n$ represents the number of times the term t occurred in calls to the destination d. This is the underlying score attached to a term-document pair.

Row t in the matrix can be thought of as an n-dimensional vector representing the term t. A column d in the matrix is an n-dimensional vector representing the document d. The dimensionality of the term vector is the number of destinations and the dimensionality of the destination vector is the number of terms.

In vector-based information retrieval systems, the product of vector representations of terms and documents yields a measure of their similarity. For instance two documents d and e may be compared by computing the product of the d-th and e-th columns of the matrix.

Most vector-based information retrieval systems normalize the result of such vector products by the lengths of the input vectors. In other words, they compute the cosine of the angle between the two vectors. The length of a vector $x = <x_1, \ldots, x_n>$ is given by:

$$\|x\| = (x \cdot x^T)^{1/2} = (\Sigma_{1 \leq t \leq n} x_t^2)^{1/2} \qquad (12)$$

The cosine between two vectors x and y is given by:

$$\cos(x,y) = (x \cdot y^T)/(\|x\| \cdot \|y\|)^{1/2} \qquad (13)$$

Using cosines advantageously reduces the contribution of each vector to its angle by normalizing for length. As a result, arbitrary scaling by a constant is simply divided back out again during the length calculation. Thus the key in maximizing the cosine between two vectors is to have them pointing in the same direction. This happens when their components are scaled in the same proportion. The cosine metric gives values within the range −1 to 1. It may be convenient to make design choices which further restrict the values. For example, if the components of all the vectors are positive, as they are with the raw frequency counts of the usage of a term, for instance, then all values are within the range 0 to 1.

A caller's query often involves more than one term, some of which may occur in more than one document. Thus, the scoring processor 309 preferably performs weighting of the term-document frequency matrix 310 in order to provide an accurate match for terms which may be contained in more than one document. The traditional method of combining query terms in vector-based information retrieval applications is simply to take the sum of their individual vector representations, and often to normalize the resulting length to one. This is the vector analog of averaging in ordinary weightings. The scores for each destination can then simply be read off this vector in order to perform matching.

In call routing, simple averaging is inappropriate, as it gives too much weight to terms that are very frequent. In order to combat this problem, the term-frequency matrix 310 is normalized so that every term representation is of the same length as a vector. The scoring processor 309 then preferably creates a normalized matrix 312 by dividing every row at of the term-document frequency matrix 310 by its length. If the normalized matrix 312 is matrix B, the elements of the matrix 312 are as follows:

$$b_{t,d} = a_{t,d} \| a_t \| \quad (14)$$

The scoring processor 309 preferably further weights the entries in the normalized matrix 312 by giving greater weight to a term that occurs in only a few of the documents 210A . . . N than is given to a term which occurs in many of the documents 210A . . . N. For instance, in calls to a banking center, the term "need" will occur in many documents, while "stop payment" will not. Thus, the second term should be given more weight in the request "I need to stop payment on a check". The scoring processor 309 thus advantageously applies an inverse-document frequency weighting factor to the normalized matrix 312, weighting each term inversely to the number of documents in which it occurs. A preferred exemplary formula for computation of the inverse-document weighting factor is given by:

$$IDF(t) = \log_2(n/Nd(t)), \quad (15)$$

where t is a term, n is the number of documents in the corpus, and Nd(t) is the number of documents containing the term t. If t occurs in only one document, then Nd(t) is equal to 1 and it follows that $IDF(t) = \log_2 n$; if t occurs in every document, then Nd(t) is equal to n, and therefore (n/Nd(t)) is equal to 1. It then follows that $IDF(t) = \log_2 1$, which is equal to 0. Terms that occur in every document can thus be eliminated under this weighting scheme. An alternative in which no terms would disappear would be to add 1 to the number of documents in the numerator. The scoring processor 309 creates a weighted matrix 314 by multiplying each row t by IDF(t) to arrive at the matrix 314. If the weighted matrix 314 is referred to as matrix C, the contents of the weighted matrix 314 are:

$$c_{t,d} = IDF(t) \cdot b_{t,d} \quad (16)$$

Finally, the weighted matrix 314 is copied to the scoring matrix 212, and in accordance with the principles of the present invention, discriminative training processor 316 adjusts the values of scoring matrix 212 such that when it is used by routing module 206 as illustrated in FIG. 2, user classification requests will result in a reduced classification error rate. Specifically, in accordance with an illustrative embodiment of the present invention, the iterative procedure described in detail above and based on the GPD algorithm is employed by discriminative training processor 316 to adjust the values of scoring matrix 212.

In accordance with one illustrative embodiment of the present invention, the training system 300 may also produce a set of confidence data 318 for each call in the training data, using a routing value of 1 if a call should be routed to a particular destination and 0 otherwise. For each destination, the training system 300 may advantageously use the least squared error method, fully familiar to those skilled in the art, in fitting a sigmoid function, $1/(1+e^{-(ax+b)})$ to the set of cosine routing pairs to produce a confidence matrix 318. The reason for mapping from cosine scores to confidence scores is that the absolute degree of similarity between a request and a destination, as given by the cosine value between their vector representations, does not translate directly into the likelihood for correct routing. Instead, some destinations may require a higher cosine value or a higher degree of similarity than others in order for a request to be correctly associated with that destination.

Figure 4:
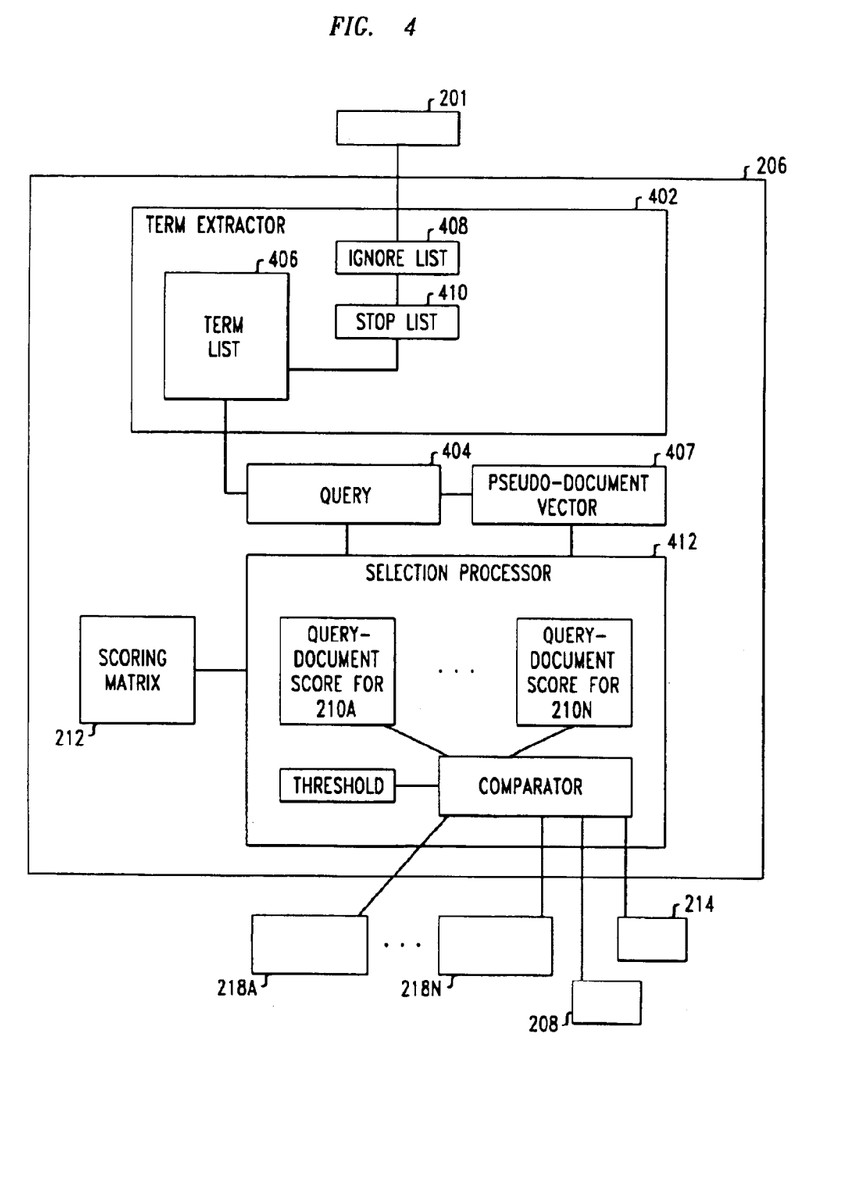
FIG. 4 shows an illustrative routing module for use in the illustrative call routing system of FIG. 2.

FIG. 4 is a more detailed illustration of the routing module 206 illustrated in FIG. 2. The routing module 206 includes a term extractor 402. The term extractor 402 receives text generated by the automated voice recognition system from the caller's voice responses, and extracts relevant terms from the text. The terms are organized to form a query 404, which is used to match the caller's response to one of the set of documents 210A . . . 210N using information contained in the scoring matrix 212.

Each of the documents 210A . . . 210N is a bag or collection of terms associated with a particular destination. A term is a single or multiple-word utterance which has relevance to the routing function. Each of the documents 210A . . . N includes all terms in calls which were routed to the associated destination during formation of the documents 210A . . . N by the training system described in connection with the discussion of FIG. 3. Each of the documents 210A . . . N, and the query 404, consists simply of a bag of terms, without considering syntactical structure or true information content, but simply the occurrence of terms within the document or the query. The assumption in a bag-of-terms model is that if a term occurred frequently with a given destination during the training phase, then the occurrence of that term in the caller's responses indicates that the call should be routed to that destination.

Each of the terms extracted from the caller's voice responses by the term extractor 402 is preferably a term encountered during operation of the training system 300. That is, the term extractor 402 preferably restricts its selection of words and phrases used in formation of the query 404 to those encountered by the training system. Eligible words and phrases may be maintained in an eligible term list 406. Only words and phrases appearing in the term list 406 may be used in the query 404.

Terms consist of single or multiple-word utterances that have relevance to the call destination. The terms extracted from the caller's responses are terms which have been selected during a training phase. Details of the selection of terms will be further described below. The term extractor performs morphological processing on each term to extract the root form of the term. The term is then subjected to further filtering.

Terms consist of n-grams. An n-gram is a phrase or sentence consisting of n words. By way of illustration, "check" is a unigram. "checking account" is a bigram. and "auto loan application" is a trigram. In some illustrative embodiments of the present invention, only unigrams are employed. In other illustrative embodiments, bigrams, and possibly trigrams are employed as well.

In order to ensure that the extracted terms are useful for the call routing task, the term extractor 402 performs filtering operations on the text received from the automated voice recognition circuit against words on an ignore list 408 and, in some illustrative embodiments of the present invention, a stop list 410. Words appearing on the noise list are removed altogether, while words appearing on the stop list (if any) are replaced by stops.

The term extractor 402 forms the terms collected from a call into the query 404. The query 404 may be represented by a vector Q, where each component $q_i$ represents a number of times that the i-th term occurred in the caller's request. The query 404 is then used to create a pseudo-document vector 407. The pseudo-document vector 407 can be represented as D=QU, following the standard methodology of vector-based information retrieval, familiar to those skilled in the art. D is simply the sum of the term vectors U, for all terms occurring in the caller's request, weighted by their frequency of occurrence in the request, and scaled properly for document/document comparison. The pseudo-document vector 407 is then used for matching to one of the documents 210A . . . N. In order to perform the selection, the routing module 206 employs a selection processor 412, which computes the cosine between D and each of the documents 210A . . . N. In order to compute the cosine between D and each of the documents, the selection processor 412 retrieves scoring information relating for each document from the scoring matrix 212 whose creation is described above in connection with the discussion of FIG. 2. Next, the cosine score for each of the documents 210A . . . N is transformed using a sigmoid function specifically fitted for the document 210A . . . N to produce a query-document score which represents the confidence of the selection processor 412 that the pseudo-document 407 matches the scoring information associated with the document 210A . . . N. The scoring information for each of the documents 210A . . . N is found in the scoring matrix 212. The selection processor 412 compares the query-document score for each of the documents against a threshold. If the query-document score meets or exceeds the threshold for exactly one document, the routing module routes the call to the destination associated with the document whose score meets the threshold. If the query-document score meets the threshold for more than one document, the query is ambiguous, and the call may be transferred to the disambiguation module 208. If no document has a score meeting the threshold, the call may be transferred to a human operator 214.

Figure 5:
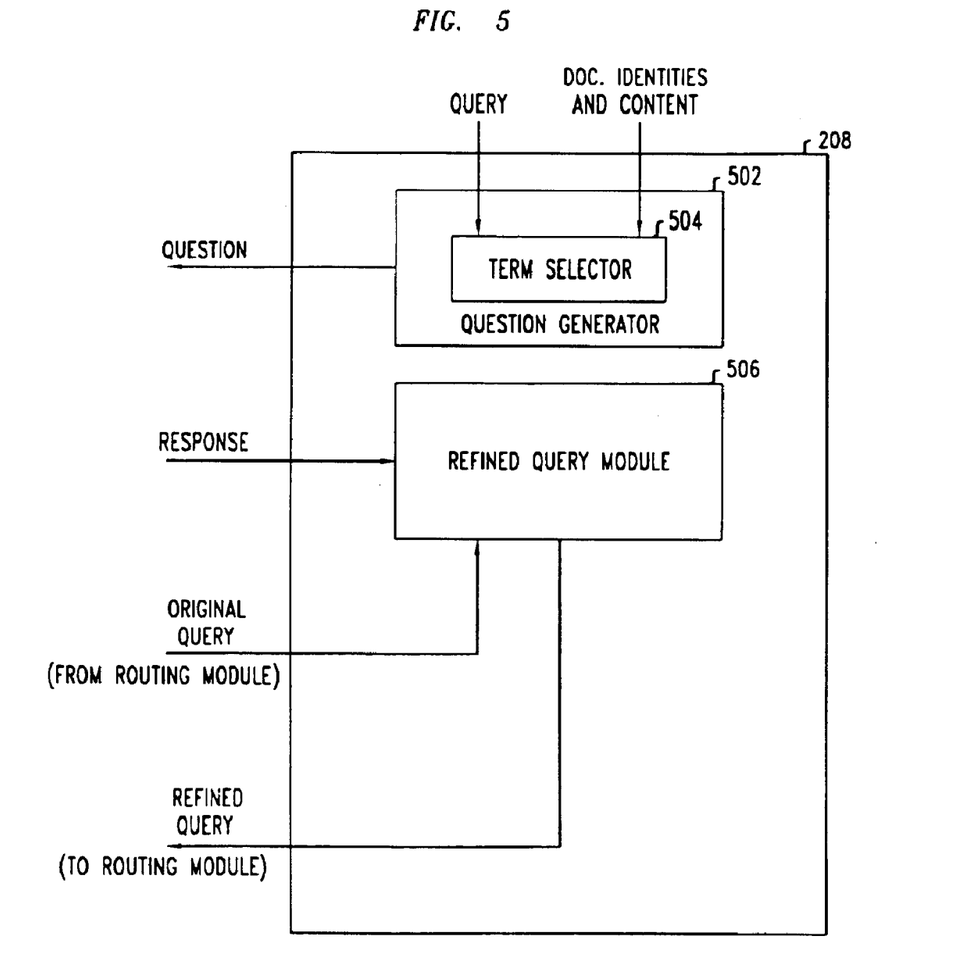
FIG. 5 shows an illustrative disambiguation module for use in the illustrative call routing system of FIG. 2.

FIG. 5 illustrates in greater detail the disambiguation module 208 shown in FIG. 2. The disambiguation module 208 adds to the usefulness of the routing system 200 shown in FIG. 2, as not every call received by a call center is phrased in such a way that it can be unambiguously routed to a particular destination. The disambiguation module 208 is employed to assist in directing a call when the query 404 shown in FIG. 4 results in a score above a specified threshold for more than one of the documents 210A . . . N. The ambiguity module 208 employs a natural dialog similar to that employed by a human operator, asking follow-up questions of a caller in order to clarify the caller's intentions. The ambiguity module 208 includes a disambiguating Question generator 502 which preferably generates questions which are easy for the customer to answer and the answers to which are easy to comprehend in the sense of translating them to routing decisions.

The disambiguation module 208 receives the query 404 and the pseudo-document vector 407 from the routing module 206, along with identities of the documents within the set of documents 210A . . . N which exceed the threshold. The query and the identities of the documents are passed to the question generator 502, which creates disambiguating questions using terms that are close, relevant, and disambiguating with respect to the documents. The question generator employs a term selector 504, which has access to the content of the documents 210A . . . N in order to find and select appropriate terms.

The question generator 502 examines the terms selected by the term selector 504 to determine an appropriate question. The question is relayed to the caller and the response is passed to a refined query module 506. The refined query module 506 combines the caller's response with the original query 404, which creates a new query which is passed to the routing module 206. If the call is still unable to be routed after the question has been answered, the routing module 206 may pass the call back to the disambiguation module 208 to prepare an additional question for the caller, but the number of repetitions of disambiguating questions is preferably limited to a predetermined number, and once that number is reached the call is then preferably routed to a human operator.

Figure 6:
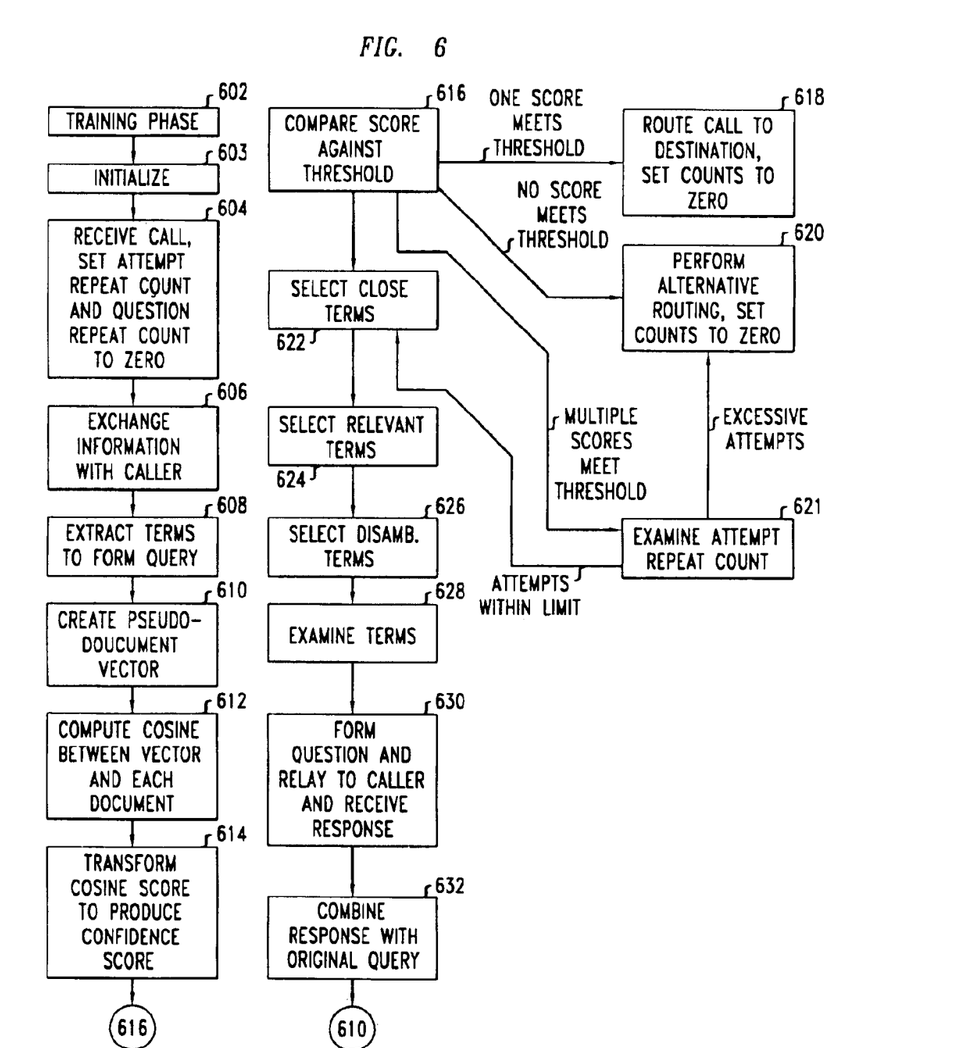
FIG. 6 shows an illustrative method of performing call routing including the use of a training phase which may be advantageously performed in accordance with an illustrative embodiment of the present invention.

FIG. 6 is a flowchart illustrating a method of call routing including the use of a training phase which may be advantageously performed in accordance with an illustrative embodiment of the present invention. At step 602, a training phase in accordance with an illustrative embodiment of the present invention is executed to create a document associated with each destination and to create a scoring matrix for selecting a document. Details of the training phase in accordance with the principles of the present invention have been described in detail above, and one possible illustrative training phase procedure will be illustrated in greater detail in FIG. 7 below. Step 602 may be executed only so often as it is desired to train the system. The subsequent steps shown in FIG. 6 are preferably executed at every call.

At step 603 initialization occurs. A question repeat count value and an attempt repeat count value are set to zero. These values are used to determine when an excessive number of disambiguating questions have been posed to a caller. Their use will be discussed more fully in connection with the discussion of subsequent steps. Limits for the question repeat count and attempt repeat count are also set. At step 604, a call is received. At step 606, information is exchanged with the caller, typically by means of questions posed to the caller and responses received from the caller. At step 608, terms are extracted from the responses to form a query. At step 610, the query is used to create a pseudo-document vector D. The pseudo-document vector is then used for matching to one of the documents. In order to perform the selection, the cosine between D and each of the documents is computed at step 612. Next, at step 614, the cosine score for each of the documents is transformed using a sigmoid function specifically fitted for the document to produce a query-document score which represents the confidence that the pseudo-document matches that document.

At step 616, the query-document score for each of the documents is compared against a threshold. If the query-document score meets or exceeds the threshold for exactly one document, control is passed to step 618 and the call is routed to the destination associated with the document whose score meets the threshold. If no document has a score meeting the threshold, control is passed to step 620 and the call is routed by alternative means. For example, the call may be routed to a human operator, or may be transferred to a conventional voice menu system. The attempt repeat count and the question repeat count are also set to zero. If the query-document score meets the threshold for more than one document, the query is ambiguous. Control is passed to step 621 and the attempt repeat count is examined to determine if an excessive number of attempts have been made. If the attempt repeat count is within limits, control is passed to step 622. If the attempt repeat count is not within limits, control is passed to step 620 and the call is routed by alternative means and the counts are set to zero.

In order to create disambiguating questions, terms must be selected which are close, relevant, and disambiguating. At step 622, terms are selected which are close with respect to the documents. At step 624, relevant terms are selected from among the close terms collected in step 622. At step 626, relevant terms are chosen from the set of compounds formed which, when added to the query, result in an unambiguous routing.

At step 628, the selected terms are examined to determine an appropriate question. If the selected terms share a common headword, control is passed to step 630 and a disambiguating question is formed and relayed to the caller and the caller's response received. Next, control is passed to step 632 and the caller's response is combined with the original query to create a new query. Control is then passed to step 610 and another attempt at routing is made.

Figure 7:
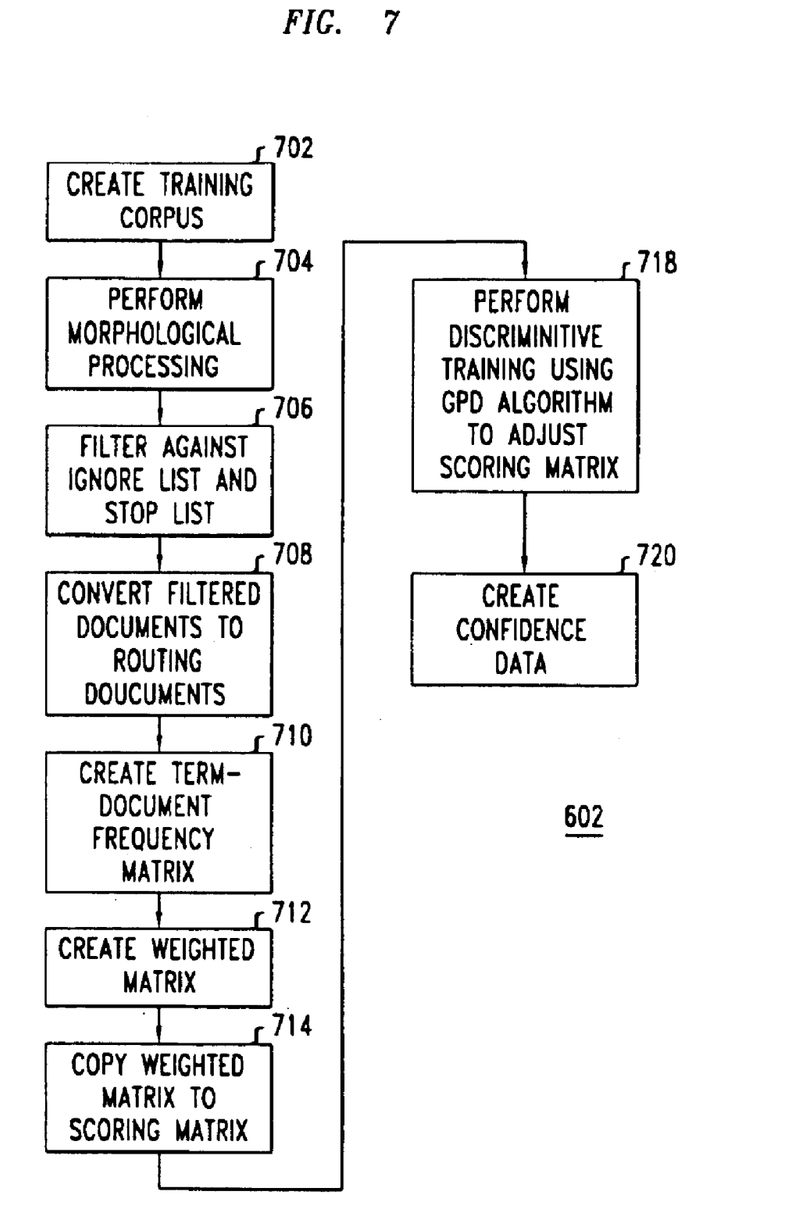
FIG. 7 shows an illustrative method of training in accordance with the principles of the present invention which may be advantageously employed with the illustrative method of performing call routing as shown in FIG. 6.

FIG. 7 is a flowchart illustrating in greater detail the training step 602 discussed above in connection with FIG. 6. More particularly, FIG. 7 shows an illustrative method of training in accordance with the principles of the present invention which may be advantageously employed with the illustrative method of performing call routing shown in FIG. 6.

At step 702 a training corpus is created by receiving a plurality of calls, routing each call to a destination via a human operator, and saving the text of the caller's contribution to each call in a training document associated with the destination to which the call is routed. The text may be saved automatically with a speech recognition module, may be transcribed by a human, or may be saved in any other desirable way.

At step 704, each of the training documents is subjected to morphological processing that extracts the root form of each word of the document. Next, at step 706. the root forms of caller utterances are filtered through two lists, an ignore list and a stop list. (As pointed out above, no stop list is used in certain embodiments of the present invention.) "Noise words" found on the ignore list, for example, which are words that do not represent an articulate utterance, are simply filtered out. The stop list (if employed) provides a list of common function words that are irrelevant for a routing task. Which words appear on the stop list will depend on the application, but typically such words will be function words such as "the" and "is". Unlike noise words, note that words on the stop list will interrupt "n-grams". That is, the presence of a stop word in a phrase will prevent the phrase from being recognized as an n-gram. Thus, if the word "the" is on the stop list, the term extractor will not extract the bigram "check balance" from the utterance "check the balance in my savings account."

After filtering is completed, control is transferred to step 708 and the result of filtering each of the training documents is converted to a corresponding document to be used for routing calls. As discussed above in connection with the discussion of FIG. 6, each of the documents thus created is used by the destination for each call.

Next, at step 710, a term-document frequency matrix is created. A caller's query often involves more than one term, some of which may occur in more than one document. Control is therefore passed to step 712 and the term-document frequency matrix is weighted in order to provide an accurate match for terms which may be contained in more than one document. The traditional method of combining query terms in vector-based information retrieval applications is simply to take the sum of their individual vector representations (and often to normalize the resulting length to one). This is the vector analogue of averaging in ordinary weightings. The scores for each destination can then simply be read off this vector in order to perform matching.

As pointed out above, in a call routing application, simple averaging is inappropriate, as it gives too much weight to terms that are very frequent. In order to combat this problem, the term-frequency matrix is normalized so that every term representation is of the same length as a vector. A normalized matrix is thus created by dividing every row at of the term-document frequency matrix by its length.

At step 714, the weighted matrix developed by the training system is copied to a scoring matrix, which, after discriminative training is performed, will be used by the routing method discussed above in connection with FIG. 6. Then, at step 718, discriminative training is performed in accordance with the principles of the present invention. In particular, and in accordance with the illustrative embodiment of the present invention shown in FIG. 7, an iterative procedure as described in detail above and based on the GPD algorithm is performed so as to adjust the values of the scoring matrix such that classification requests during call routing will result in a reduced classification error rate.

Finally, at step 720, a set of confidence data is created for each call in the training data, using a routing value of 1 if a call should be routed to a particular destination and 0 otherwise. For each destination, the least-squared error method is used in fitting a sigmoid function, $1/(1+e^{-(ax+b)})$ to the set of cosine routing pairs to produce the confidence matrix. As pointed out above, the reason for mapping from cosine scores to confidence scores is that the absolute degree of similarity between a request and a destination, as given by the cosine value between their vector representations, does not translate directly into the likelihood for correct routing. Instead, some destinations may require a higher cosine value (that is, a higher degree of similarity) than others in order for a request to be correctly associated with that destination.

Addendum to the Detailed Description

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope.

For example, although the above illustrative system has been described with specific reference to the automated call routing application, it will be obvious to those skilled in the art that the principles of the present invention can be easily adapted and similarly applied to various other applications such as, for example, information (e.g., document) searching and/or retrieval, on-line interactive question and answer sessions, automated e-mail or other text document classification and/or routing, and many other applications which involve speech and/or text understanding and/or topic identification. Such applications may make use of natural language text which has either been directly typed by a user of the particular system, written (e.g., by hand) by such a user, or, as in the typical case of the above-described call routing application, verbally spoken by the user (followed by a preferably automated speech-to-text conversion process).

In addition, various illustrative embodiments of the present invention may, in addition to the above-described natural language text-based features, make use of other non-text based features in the classification process. In one illustrative embodiment of the present invention, for example, a document retrieval system such as is described above supplements the features obtained from the user's text-based requests with other features relating to known or otherwise provided information about the user. For example, these features may be based on a known history or on certain interests of the user, which may, in one example, be derived from knowledge of the identity of various web pages that the given user has recently or previously visited.

Moreover, although the above illustrative discriminative training procedure has been specifically focused on a method for adjusting the numerical values in a scoring (e.g. routing) matrix, it will be obvious to those of ordinary skill in the art that multiplicative or exponential weights or other parameters which are used in conjunction with a scoring matrix may be equivalently modified by such a discriminative training procedure in order to effectuate an essentially identical result. That is, the term scoring matrix as used herein is intended to encompass both a scoring matrix itself and any other parameters used in conjunction with the scoring matrix to effectuate the resultant classifications when given a natural language based input or query.

Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explictly shown.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation. digital signal processor (DSP) hardware, read-only memory (ROM) for storing software, random access memory (RAM), and non-volatile storage. Other hardware, conventional and/or custom, may also be included. Similarly, any switches shown in the FIGS. Are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent (within the meaning of that term as used in 35 U.S.C. 112, paragraph 6) to those explicitly shown and described herein.

What is claimed is:

1. A method of training a scoring matrix for use by a classification system, the classification system for use in performing classification requests based on natural language text and with use of said scoring matrix which has been based on a set of training data comprising natural language text, the method comprising the steps of:

generating an initial scoring matrix comprising a numerical value for each of a set of n classes in association with each of a set of m features, the initial scoring matrix based on said set of training data and, for each element of said set of training data, based on a subset of said features which are comprised in said natural language text of said element of said set of training data and on one of said classes which has been identified therefor; and based on the initial scoring matrix and said set of training data, generating a discriminatively trained scoring matrix for use by said classification system by adjusting one or more of said numerical values such that a greater degree of discrimination exists between competing ones of said classes when said classification requests are performed, thereby resulting in a reduced classification error rate, wherein said step of adjusting said numerical values is performed with use of a Generalized Probabilistic Descent algorithm and wherein said step of adjusting said numerical values comprises, for each element of said set of training data, modifying values associated with the identified class and values associated with one or more of the other classes such that a score obtained for said element of said set of training data based on said modified values associated with the identified class is improved relative to one or more scores obtained for said element of said set of training data based on said modified values associated with said one or more other classes.

2. The method of claim 1 wherein said values are modified based on the following equation of the form:

$$r_{vw}(t+1) = \begin{cases} r_{vw}(t) + \varepsilon_i \frac{\partial l_k}{\partial d_k} x_w & \text{if } v = k \\ r_{vw}(t) - \frac{\varepsilon_i \frac{\partial l_k}{\partial d_k} x_w G_k(\vec{x}_i, R)(\vec{r}_v \cdot \vec{x}_i)^{\eta-1}}{\sum_{j \neq k} (\vec{r}_j \cdot \vec{x}_i)^{\eta}} & \text{if } v \neq k. \end{cases}$$

3. The method of claim 1 wherein said classification requests comprise call routing requests, wherein said classes comprise call routing destinations, and wherein said set of training data comprises call routing requests together with associated identified call routing destinations therefor.

4. The method of claim 1 wherein said classification requests comprise document retrieval requests, wherein said classes comprise documents, and wherein said set of training data comprises document retrieval requests together with associated identified documents therefor.

5. The method of claim 1 wherein said natural language text upon which said classification requests are based and said natural language text comprised in said set of training data is processed without the use of stop word filtering.

6. The method of claim 1 wherein said step of adjusting said numerical values comprises iteratively adjusting said numerical values until a stopping criterion is met.

7. The method of claim 6 wherein said stopping criterion comprises an empirical loss threshold.

8. The method of claim 6 wherein said stopping criterion comprises a classification error rate threshold.

9. A method of performing classification requests based on natural language text and with use of a discriminatively trained scoring matrix which has been trained based on a set of training data comprising natural language text, the scoring matrix having been discriminatively trained by a method comprising the steps of:

generating an initial scoring matrix comprising a numerical value for each of a set of n classes in association with each of a set m features, the initial scoring matrix based on said set of training data and, for each element of said set of training data, based on a subset of said features which are comprised in said natural language text of said element of said set of training data and on one of said classes which has been identified therefor; and based on the initial scoring matrix and said set of training data, generating said discriminatively trained scoring matrix by adjusting one or more of said numerical values such that a greater degree of discrimination exists between competing ones of said classes when said classification requests are performed, thereby resulting in a reduced classification error rate, wherein said step of adjusting said numerical values is performed with use of a Generalized Probabilistic Descent algorithm and wherein said step of adjusting said numerical values comprises, for each element of said set of training data, modifying values associated with the identified class and values associated with one or more of the other classes such that a score obtained for said element of said set of training data based on said modified values associated with the identified class is improved relative to one or more scores obtained for said element of said set of training data based on said modified values associated with said one or more other classes.

10. The method of claim 9 wherein said values are modified based on the following equation of the form:

11. The method of claim 9 wherein said classification requests comprise call routing requests, wherein said classes comprise call routing destinations, and wherein said set of training data comprises call routing requests together with associated identified call routing destinations therefor.

12. The method of claim 9 wherein said classification requests comprise document retrieval requests, wherein said classes comprise documents, and wherein said set of training data comprises document retrieval requests together with associated identified documents therefor.

13. The method of claim 9 wherein said natural language text upon which said classification requests are based and said natural language text comprised in said set of training data is processed without the use of stop word filtering.

14. The method of claim 9 wherein said step of adjusting said numerical values comprises iteratively adjusting said numerical values until a stopping criterion is met.

15. The method of claim 14 wherein said stopping criterion comprises an empirical loss threshold.

16. The method of claim 14 wherein said stopping criterion comprises a classification error rate threshold.

17. An apparatus for training a scoring matrix for use by a classification system, the classification system for use in performing classification requests based on natural language text and with use of said scoring matrix which has been based on a set of training data comprising natural language text, the apparatus comprising:

means for generating an initial scoring matrix comprising a numerical value for each of a set of n classes in association with each of a set of m features, the initial scoring matrix based on said set of training data and, for each element of said set of training data, based on a subset of said features which are comprised in said natural language text of said element of said set of training data and on one of said classes which has been identified therefor; and based on the initial scoring matrix and said set of training data, means for generating a discriminatively trained scoring matrix for use by said classification system by adjusting one or more of said numerical values such that a greater degree of discrimination exists between competing ones of said classes when said classification requests are performed, thereby resulting in a reduced classification error rate, wherein said means for adjusting said numerical values executes a Generalized Probabilistic Descent algorithm and wherein said means for adjusting said numerical values comprises, for each element of said set of training data, means for modifying values associated with the identified class and values associated with one or more of the other classes such that a score obtained for said element of said set of training data based on said modified values associated with the identified class is improved relative to one or more scores obtained for said element of said set of training data based on said modified values associated with said one or more other classes.

18. The apparatus of claim 17 wherein said values are modified based on the following equation of the form:

$$r_{vw}(t+1) = \begin{cases} r_{vw}(t) + \varepsilon_i \frac{\partial l_k}{\partial d_k} x_w & \text{if } v = k \\ r_{vw}(t) - \frac{\varepsilon_i \frac{\partial l_k}{\partial d_k} x_w G_k(\vec{x}_i, R)(\vec{r}_v \cdot \vec{x}_i)^{\eta-1}}{\sum_{j \neq k}(\vec{r}_j \cdot \vec{x}_i)^{\eta}} & \text{if } v \neq k. \end{cases}$$

19. The apparatus of claim 17 wherein said classification requests comprise call routing requests, wherein said classes comprise call routing destinations, and wherein said set of training data comprises call routing requests together with associated identified call routing destinations therefor.

20. The apparatus of claim 17 wherein said classification requests comprise document retrieval requests, wherein said classes comprise documents, and wherein said set of training data comprises document retrieval requests together with associated identified documents therefor.

21. The apparatus of claim 17 wherein said natural language text upon which said classification requests are based and said natural language text comprised in said set of training data is processed without the use of stop word filtering.

22. The apparatus of claim 17 wherein said means for adjusting said numerical values comprises means for iteratively adjusting said numerical values until a stopping criterion is met.

23. The apparatus of claim 22 wherein said stopping criterion comprises an empirical loss threshold.

24. The apparatus of claim 22 wherein said stopping criterion comprises a classification error rate threshold.

25. An apparatus for performing classification requests based on natural language text and with use of a discriminatively trained scoring matrix which has been trained based on a set of training data comprising natural language text, the scoring matrix having been discriminatively trained by an apparatus comprising:

means for generating an initial scoring matrix comprising a numerical value for each of a set of n classes in association with each of a set of m features, the initial scoring matrix based on said set of training data and, for each element of said set of training data, based on a subset of said features which are comprised in said natural language text of said element of said set of training data and on one of said classes which has been identified therefor; and based on the initial scoring matrix and said set of training data, means for generating said discriminatively trained scoring matrix by adjusting one or more of said numerical values such that a greater degree of discrimination exists between competing ones of said classes when said classification requests are performed, thereby resulting in a reduced classification error rate, wherein said means for adjusting said numerical values executes a Generalized Probabilistic Descent algorithm and wherein said means for adjusting said numerical values comprises, for each element of said set of training data, means for modifying values associated with the identified class and values associated with one or more of the other classes such that a score obtained for said element of said set of training data based on said modified values associated with the identified class is improved relative to one or more scores obtained for said element of said set of training data based on said modified values associated with said one or more other classes.

26. The apparatus of claim 25 wherein said values are modified based on the following equation of the form:

$$r_{vw}(t+1) = \begin{cases} r_{vw}(t) + \varepsilon_i \frac{\partial l_k}{\partial d_k} x_w & \text{if } v = k \\ r_{vw}(t) - \frac{\varepsilon_i \frac{\partial l_k}{\partial d_k} x_w G_k(\vec{x}_i, R)(\vec{r}_v \cdot \vec{x}_i)^{\eta-1}}{\sum_{j \neq k}(\vec{r}_j \cdot \vec{x}_i)^{\eta}} & \text{if } v \neq k. \end{cases}$$

27. The apparatus of claim 25 wherein said classification requests comprise call routing requests, wherein said classes comprise call routing destinations, and wherein said set of training data comprises call routing requests together with associated identified call routing destinations therefor.

28. The apparatus of claim 25 wherein said classification requests comprise document retrieval requests, wherein said classes comprise documents, and wherein said set of training data comprises document retrieval requests together with associated identified documents therefor.

29. The apparatus of claim 25 wherein said natural language text upon which said classification requests are based and said natural language text comprised in said set of training data is processed without the use of stop word filtering.

30. The apparatus of claim 25 wherein said means for adjusting said numerical values comprises means for iteratively adjusting said numerical values until a stopping criterion is met.

31. The apparatus of claim 30 wherein said stopping criterion comprises an empirical loss threshold.

32. The apparatus of claim 30 wherein said stopping criterion comprises a classification error rate threshold.

* * * * *